United States Patent [19]

Sandoval et al.

[11] 3,957,486

[45] May 18, 1976

[54] METHOD OF REDUCING IRON ORE

[75] Inventors: Jesus A. Sandoval, Hempfield Township, Westmoreland County; Robert J. Rygiel, Monroeville, both of Pa.

[73] Assignee: United States Steel Corporation, Pittsburgh, Pa.

[22] Filed: Aug. 9, 1974

[21] Appl. No.: 496,223

[52] U.S. Cl. .......................................... 75/34; 75/5
[51] Int. Cl.² ........................................ C21B 13/02
[58] Field of Search ................... 75/3, 5, 33, 34, 35

[56] References Cited
UNITED STATES PATENTS

| | | | |
|---|---|---|---|
| 2,511,400 | 6/1950 | de Jahn | 75/34 |
| 3,682,621 | 8/1972 | Struve et al. | 75/3 |
| 3,759,693 | 8/1973 | Kunii et al. | 75/35 |

OTHER PUBLICATIONS

Ball et al., *Agglomeration of Iron Ores*, p. 256, Am. Elsevier Pub. Co., Apr. 4, 1974.

*Primary Examiner*—M. J. Andrews
*Attorney, Agent, or Firm*—William L. Krayer

[57] ABSTRACT

Pelletized iron ore is introduced into a shaft furnace and reduced in a countercurrent stream of reducing gas at a hot zone temperature of 1375°F to 1700°F. The pellets have a low silica content and, prior to indurating, a high moisture content, providing a highly porous texture which results in improved reducibility.

11 Claims, 2 Drawing Figures

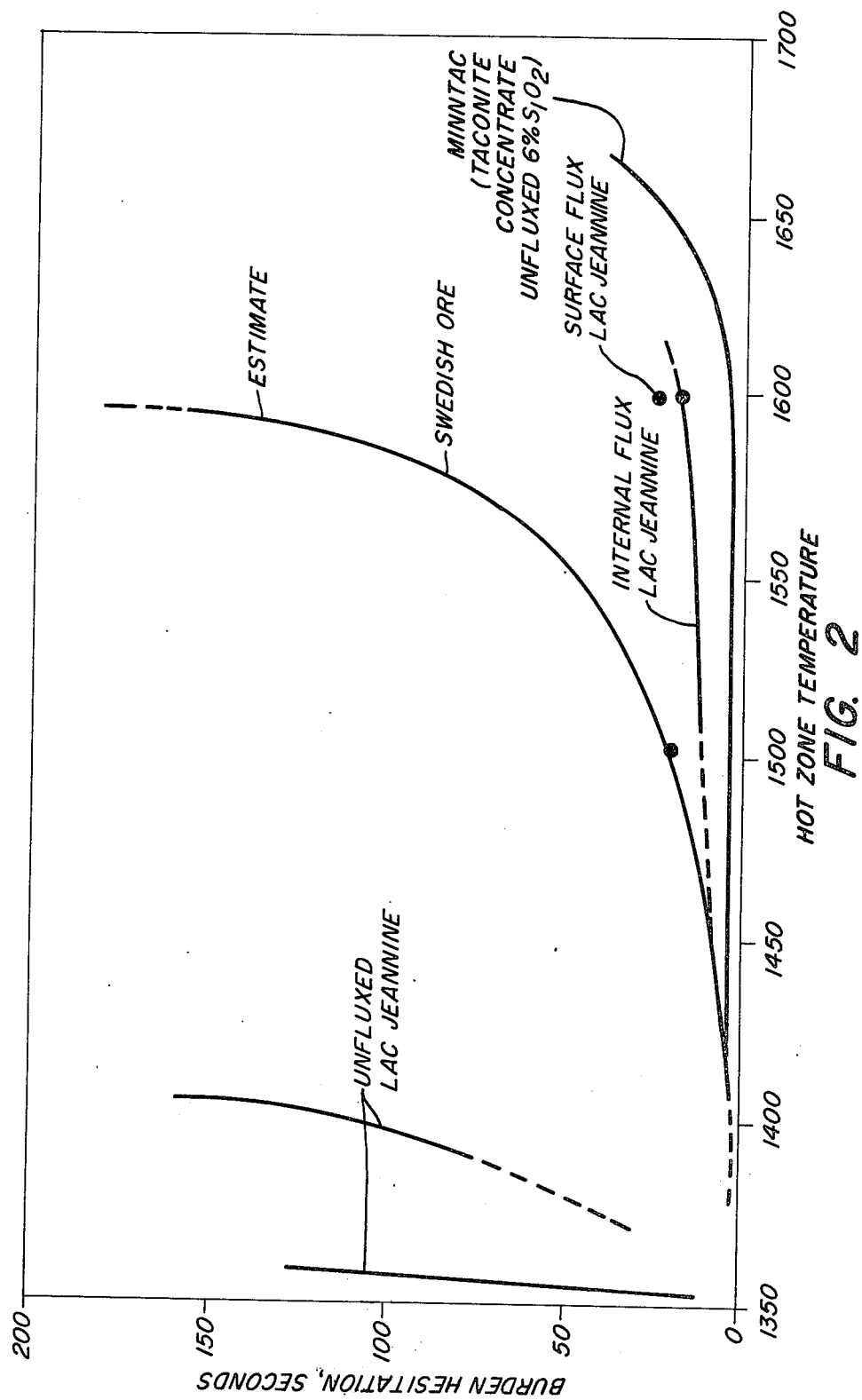

METHOD OF REDUCING IRON ORE

BACKGROUND OF THE INVENTION

The use of pelletized, reduced, iron ore did not become common in iron and steel manufacture until relatively recently, and it is probably true that 25 years ago the use of pelletized iron ore was comparatively uncommon. While pellets are now consumed in large quantities it is entirely possible that their initial appearance was the result of the age-old practice of making a virtue of necessity. Up to a quarter century ago the ore industry had employed mainly large deposits of very finely divided iron ore that proved difficult to handle from the standpoint of merchandising it in a form acceptable to the industry. Such practices as sintering and briquetting had proved to be imperfect for certain purposes and until it occured to the industry to concentrate and pelletize the ore and reduce the pelletized product, the problem remained, but reduced pelletized iron ore is now very popular for use in steelmaking, so popular in fact that it has become the preferred practice to grind ore concentrates to a degree of fineness that will facilitate good pelletizing and to merchandise the product in pelletized form.

SUMMARY OF THE INVENTION

The present invention is concerned with an improved process for the production of reduced iron ore pellets employing high porosity low silica iron oxide pellets exhibiting low clusterability, high reducibility, high strength, and low burden hesitation in the reduction unit. The process contemplates pelletizing an iron ore concentrate, fluxing and firing the pellets, charging the fired pellets into a shaft furnace reducer and moving them vertically downwardly through the reducer countercurrrent to the flow of a stream of reducing gas at a hot zone temperature within the range of about 1375° to 1700°F, the residence time in the hot zone, depending on the hot zone reducing gas composition and temperature of any given portion of the charge, being about as little as 75, generally about 125 minutes to 300 minutes. The reduced pellets are removed from the reducer continuously or in small batches.

The preferred method of reducing pellets involves the use of a shaft furnace or shaft reducer and among the factors that affect the efficiency of the process are the type of pelletized feed, the types of flux and degree of fluxing of the feed, pellet size, method of induration, reducing gas composition, temperature of reduction, degree of clustering (fusing or clinkering) of the pellets, and burden movement.

We have found that pellets of ¼ inch to ⅝ inch, preferably ⅜ inch to ½ inch, using bentonite or lime hydrate as a binder, are useful in our invention. If bentonite is used, about 0.5 to 0.75 percent, based on the dry weight of the iron ore concentrate feed. The concentrate, for best results, will generally have 60 – 70% total iron, although other ranges may be encountered in different types of ore concentrates, up to 2½% silica, and a grind having a minimum of 80% minus 325 mesh. The moisture content of the green balls before indurating should be at least 8%, preferably 8½ to 9½%, based on the total wet weight of the green balls.

Fluxing is very important in the practice of our invention as may be seen in the discussion following.

The invention will be described with reference to the accompanying drawings in which:

FIG. 2 is a graph showing burden hesitation as a function of hot zone temperature in the pilot plant.

Figure 1:
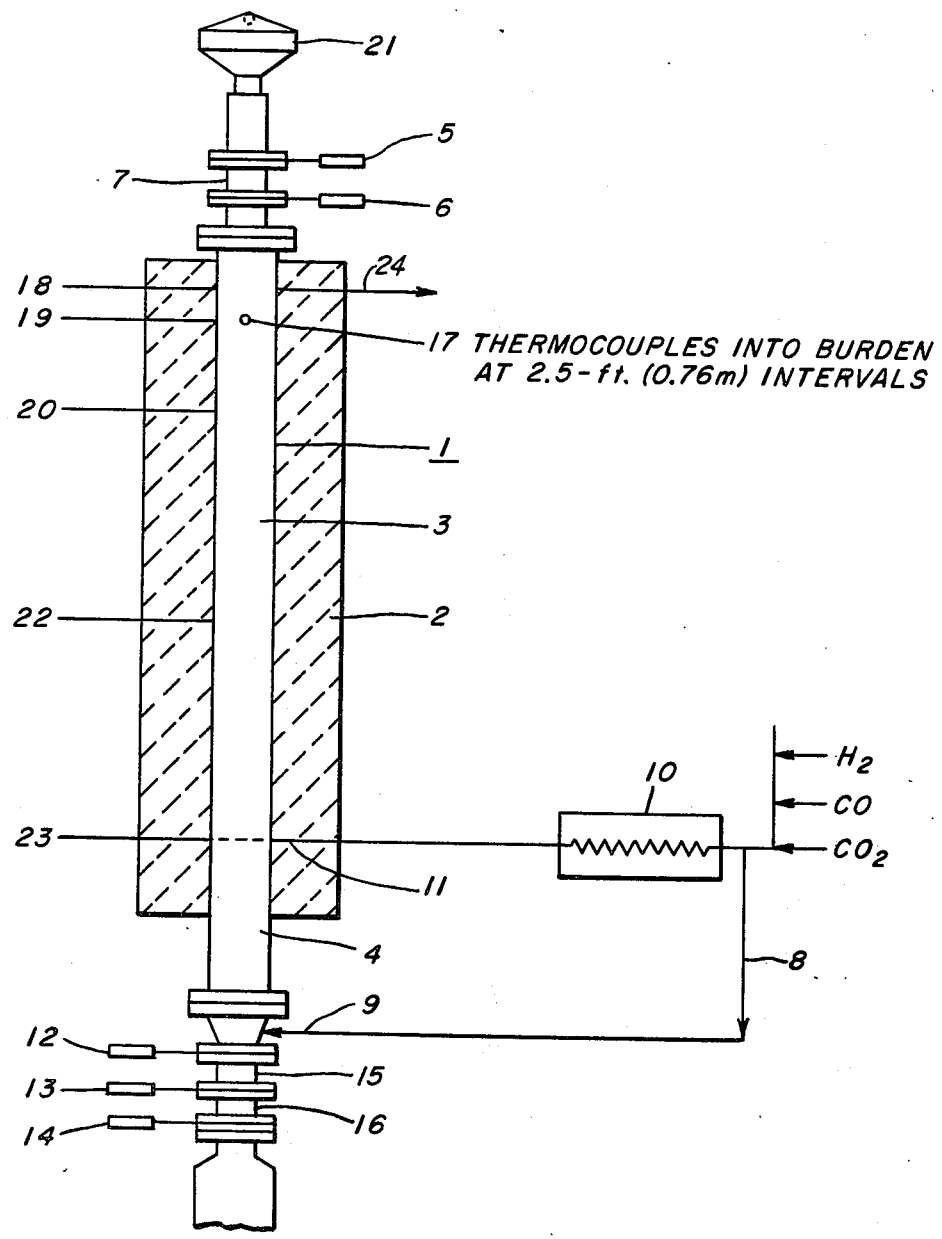
FIG. 1 is a flow sheet of a pilot plant shaft reducer.

In FIG. 1, the pilot plant shaft furnace comprises a vertical shaft body 1 preferably of stainless steel, surrounded by insulation 2 and having a reducing zone 3 occupying about the top three-fourths or more of the shaft and a cooling zone 4 although of course cooling may be accomplished in a much longer zone or outside of the reducer entirely. At the top end of the shaft is mounted a charge hopper 21 and, in this instance, a two-valve charging system comprising slide valves 5 and 6. Valves 5 and 6 define a charge chamber 7 for admitting controlled amounts of pellets to the reactor. Reducing gas, comprising major amounts of hydrogen and carbon monoxide and including possibly some $CO_2$ and/or $H_2O$ is directed through line 8 to a reducing gas lower inlet 9 and primarily to a gas heater 10 where a portion of it is heated prior to its introduction through upper inlet 11, defining the lower end of the reducing zone 3. At the lower end of the reducer is preferably a three-valve discharge system comprising slide valves 12, 13, and 14, defining chambers 15 and 16 for the controlled removal of reduced product. Pressures and temperatures may be measured at various points, as by thermocouples 17 and pressure taps 18, 19, and 20, 22 and 23. Exhaust gas is emitted at 24.

FIG. 2 is a graph depicting the problem of "burden hesitation" as a function of reducing, or "hot zone" temperature in the pilot plant with various types of iron ore pellets.

The term "burden" is used to describe the charge or load of pellets in a reducer.

It will be apparent from FIG. 2 that excessive swelling and/or clustering of the pellets in the burden will contribute to excessive "burden hesitation". That is to say, where excessive swelling or clustering has taken place, the burden will "hesitate" i.e. will not readily move through the reactor without assistance. That situation is well illustrated in FIG. 2 from which it will be evident that unfluxed pellets perform most unsatisfactorily whereas, in general, fluxed pellets can be reduced at temperatures of 1600°F or above without undue burden hesitation.

Of recent years the demand for reduced iron ore pellets has been heavy and has necessitated the development of processes of production that give the highest yields in the shortest time and certainly the fastest and most efficient processes involve the use of the shaft reduction technique. According to earlier processes, temperatures of reduction were relatively low and residence time in reducing equipment relatively long so that the type and composition of pellets used in reducers were not major factors.

Applicants however were faced with the problem of developing a process that would involve the use of high quality iron ore (hematite) concentrates, such concentrates being quite low in silica, the silica content ranging between 0.5 and 2.5 percent. According to applicants' requirements the ideal pellet had to be of low clusterability and of high reducibility and strength.

Initially, several batches of pellets were prepared and reduced in a shaft reducer and, while it was observed that the pellets exhibited good strength and reducibility characteristics, they tended to cluster or clinker with the result that burden movement was prolonged or became erratic and in some cases stopped completely.

It was soon realized that pellet composition and porosity were of great significance and would have to be modified if a satisfactory reduction in clustering was to be achieved without decreasing reducibility of the pellet. As the clustering problem was studied further, it was observed that erratic burden movement could be reduced by the addition to the pellet composition of finely-divided limestone in the amount of about 1.0 to 8.5% based on the total dry weight of the pellets themselves or of the dry ore concentrate composition to be pelletized including additions such as binders. The limestone referred to will provide a pellet basicity ($CaO + MgO/SiO_2 + Al_2O_3$) within the range of about 0.25 to 2.5 (preferably 0.75 to 1.5). Lime hydrate may be used as a combination binder and flux in concentrations from 0.5 to 2.0%, in which case bentonite need not be used, although additional flux may be included.

The process according to the invention is generally conducted as follows. Ore concentrates are pelletized and fluxed, the pellets are then heated and fired for the purpose of induration, consolidation, hardening, and moisture removal. Following cooling, the pellets are charged into a shaft furnace or reducer and the charge reduced by means of hot reducing gas flowing countercurrently, the charge of reduced pellets of iron is cooled and removed from the furnace and stored for shipment.

The reducing gas composition will always include hydrogen ($H_2$) and carbon monoxide (CO). Typically, commerical reducing gases contain at least about 20% CO. As typical compositions, we have employed gases of 53% $H_2$, 42% CO, 5% combination and $CO_2$ and $H_2O$ and 68% $H_2$, 23% CO, 2%, $CO_2$ and 7% $H_2O$.

The Examples that appear below are results from benchscale reduction tests which simulate conditions in a shaft reduction unit and will serve to illustrate the invention but it is not intended that they be given a limited or restricted interpretation.

In the load test, a 2.0-pound sample of pellets (½ by ⅜ inch) of known volume is charged into a 2½-inch-diameter stainless steel tube reactor. Reduction is started when the temperature of the sample reaches 800°F by turning on the reducing gas at a constant flow rate of 4.0 scfm.

The reducing gas is introduced at the bottom of the preheater and passes up through the test sample. The composition of the reducing-gas mixture is changed, stepwise to approximate the change in the gas composition that occurs in a continuous shaft-reduction unit as the material passes down through the shaft. While the test sample is undergoing reduction for a total of 5.0 hours reduction time, a varying load is applied on the sample according to the following time schedule:

| Time, hr. | Temperature, F | Gas Composition | Applied Load, psi |
| --- | --- | --- | --- |
| 0 to 1 | 800 to 1470 | Varied up to 126 minutes and then held constant at the percentages noted below: 68% $H_2$, 23% CO, 2% $CO_2$, 7% $H_2O$ | 0 |
| 1 to 3 | 1470 to 1600 | | 5 |
| 3 to 5 | 1600 | | 10 |

The concentrate used for the pellets should be ground to obtain a size consist of at least 80% minus 325 mesh. Moisture in the green pellets should be from 7 – 12%, preferably 8.5 to 9.5%, in order to achieve high porosity. We have found that dry-ground concentrate will not practically permit balling at the 8½% moisture level or higher, and accordingly we prefer to use wet grinding, and take the wet-ground concentrate directly from the wet grinding circuit into the balling process.

Any conventional pellet drying, preheating, and/or indurating process may be used.

Pellet basicity may be as high as 2.5 which, as noted above, would be that resulting from the addition of 8½% limestone. Other fluxing materials that may be used are lime, lime hydrate, and dolomite, but limestone and dolomite are preferred. The flux may be incorporated into the pellet material prior to pelletizing (internal fluxing) or coated on the surface of the green pellets (surface fluxing).

The sample is allowed to cool to room temperature after reduction before it is taken out of the reactor. The reduced sample is carefully discharged from the reactor to avoid breaking any clusters and is then weighed and its volume determined. The compressive strength and drop-test index of the sample are also determined, and the degree of reduction is calculated from the results of the chemical analysis.

With reference to the tables, the drop-test index of the reduced material is determined by dropping a 1.0 - pound sample of whole pellets six times from a height of 10 feet. The amount in percent of plus ¼ inch material remaining after six drops is recorded as the drop test index, the higher the index the stronger and more resistant to crumbling are the pellets.

In Examples I and II that follow, the temperature during the final (hot zone) reducing period was 1600°F to 1620°F and the degree of reduction was always in excess of 90%.

EXAMPLE I

Selected samples of pellets of varying basicity and silica content was subject to the two reduction procedures referred to above the results being recorded in Table I.

Table I
Effect of Flux on Clustering During Reduction

| Hot Zone Temp. °F | Type of Concentrate | Silica, % | Limestone, % | Basicity | Clusters,* % | Volume Change, % | Compressive Strength, lb. | Drop-Test Index |
| --- | --- | --- | --- | --- | --- | --- | --- | --- |
| 1450 | LJ | 1.2 | 0 | 0 | 25 | NA | 98 | 79.0 |
| 1600 | LJ | 1.2 | 0 | 0 | 30 | −26 | 312 | 94.2 |
| 1450 | Lj | 1.2 | 2.0 | 0.8 | 3 | −4 | 268 | 94.0 |
| 1600 | LJ | 1.2 | 2.0 | 0.8 | 13 | −10 | 283 | 98.6 |
| 1450 | LJ | 1.9 | 3.3 | 0.8 | 9 | −2 | 305 | 96.9 |
| 1600 | LJ | 1.9 | 3.3 | 0.8 | 4 | −2 | 351 | 98.7 |
| 1450 | FL | 1.5 | 0 | 0 | 45 | −18 | 244 | 92.3 |
| 1600 | FL | 1.5 | 0 | 0 | 42 | −25 | 539 | 98.7 |

EXAMPLE I-continued

Selected samples of pellets of varying basicity and silica content was subject to the two reduction procedures referred to above the results being recorded in Table I.

Table I
Effect of Flux on Clustering During Reduction

| Hot Zone Temp. °F | Type of Concentrate | Silica, % | Limestone, % | Basicity | Clusters,* % | Volume Change, % | Compressive Strength, lb. | Drop-Test Index |
|---|---|---|---|---|---|---|---|---|
| 1450 | FL | 1.5 | 1.0 | 0.4 | 26 | −5 | 278 | 97.1 |
| 1600 | FL | 1.5 | 1.0 | 0.4 | 16 | −15 | 346 | 96.7 |
| 1450 | FL | 2.3 | 0 | 0 | 56 | −14 | 284 | 85.2 |
| 1600 | FL | 2.3 | 0 | 0 | 37 | −32 | 406 | 93.4 |
| 1450 | FL | 2.3 | 2.0 | 0.4 | 22 | +4 | 450 | 99.1 |
| 1600 | FL | 2.3 | 2.0 | 0.4 | 32 | −2 | 441 | 98.7 |
| 1600 | FL | 1.9 | 0 | 0 | 40 | −18 | 344 | 100 |
| 1600 | FL | 1.9 | 1.8 | 0.5 | 16 | −12 | 216 | 100 |
| 1600 | FL | 1.9 | 3.5 | 1.0 | 0 | −12 | 324 | 100 |
| 1600 | FL | 1.9 | 8.5 | 2.5 | 15 | −5 | 224 | 100 |

* Amount of 2 or more pellets sticking together (weight % of total)

EXAMPLE II

The effect of the type of concentrate used for the pellets was determined, as shown in Table II.

Table II
Effect of Type of Concentrate on Clustering

| Type of Concentrate | Silica, % | Limestone, % | Basicity | Clusters, % | Volume change, % | Compressive Strength, lb. | Drop-Test Index |
|---|---|---|---|---|---|---|---|
| Fire Lake | 1.5 | 0 | 0 | 42 | −25 | 539 | 98.7 |
| Mount Wright | 1.8 | 0 | 0 | 65 | −27 | 453 | 96.5 |
| Lac Jeannine | 1.2 | 0 | 0 | 28 | −23 | 327 | 98.0 |
| Fire Lake | 1.5 | 3.0 | 1.0 | 15 | 0 | 427 | 99.9 |
| Mount Wright | 1.8 | 3.5 | 0.9 | 8 | −2 | 458 | 99.3 |
| Lac Jeannine | 1.8 | 3.5 | 0.9 | 13 | +9 | 652 | 99.9 |

Example III

The effect of firing temperature was determined in relation to reduction temperature, as shown in Table III.

Table III
Effect of Firing Temperature on the Results of Shaft Reduction

| Firing Temp, F | Type of Concentrate | Hot Zone Temp °F | Silica,% | Limestone,% | Basicity | Clusters,% | Volume Change,% | Compressive Strength,lb | Drop-Test Index |
|---|---|---|---|---|---|---|---|---|---|
| 2000 | Fire Lake | 1600 | 1.5 | 0 | 0 | 99 | −29 | 391 | 99.1 |
| 2350 | Fire Lake | 1600 | 1.5 | 0 | 0 | 42 | −25 | 539 | 98.7 |
| 1900 | Lac Jeannine | 1450 | 1.2 | 2.0 | 0.8 | 35 | 0 | 35 | 31.0 |
| 2350 | Lac Jeannine | 1450 | 1.2 | 2.0 | 0.8 | 3 | −4 | 268 | 94.0 |

Table IV
Effect of Lime Hydrate Addition on Clustering

| Hot Zone Temp. °F | Type of Concentrate | Silica, % | Lime Hydrate,% | Basicity | Clusters,% | Volume Change,% | Compressive Strength,lb | Drop-Test Index |
|---|---|---|---|---|---|---|---|---|
| 1600 | Fire Lake | 1.9 | 0 | 0 | 40 | −18 | 344 | 100 |
| 1600 | Fire Lake | 1.5 | 2 | 1.0 | 15 | −6 | 276 | 100 |

Table V
Effect of Dolomite Addition on Clustering

| Hot Zone Temp.°F | Type of Concentrate | Silica, % | Dolomite,% | Basicity | Clusters,% | Volume Change,% | Compressive Strength,lb | Drop-Test Index |
|---|---|---|---|---|---|---|---|---|
| 1600 | Fire Lake | 1.9 | 0 | 0 | 40 | −18 | 344 | 100 |
| 1600 | Fire Lake | 1.9 | 3.5 | 1.0 | 0 | −10 | 250 | 100 |
| 1600 | Fire Lake | 1.9 | 8.7 | 2.5 | 11 | −4 | 235 | 100 |

The effect of unfired pellets moisture content on porosity of the fired pellet is illustrated by the fact that as moisture content is increased from 7% to 9%, the porosity (measured as percent voids) increased from 21½ to 29. The effect of fired pellet porosity on pellet reducibility is illustrated by the fact that percent reduction (percent oxygen removal) under identical conditions increased from 75% to 88% with an increase in open porosity (measured by a mercury porosimeter) from 12% to 21%. Total porosity calculated by the formula $$100 \times \left(1 - \frac{\text{apparent density}}{\text{true density}}\right)$$

should be at least 26, but would not be expected to exceed 35.

The pellet compositions used in Examples included 0.5% bentonite to serve as a binder except where lime hydrate is used.

The Examples and tabular data establish that the addition of limestone or dolomite, or lime hydrate to pellets prior to firing is effective in decreasing cluster formation during reduction.

All pellets showed acceptable volume change.

Firing temperature appears to be significant factor, a high temperature being effective in reducing clustering during subsequent reduction, but may at 2400°F, for example, affect reducibility by closing pores.

Production efficiency is a function or residence time, reduction temperature, pellet clusterability and basicity. The higher the "hot zone" temperature, the faster the rate of reduction. It has been estimated that production can be increased by approximately as much as 20% for every 100°F increase in "hot zone" temperature in the reducer with no increase in reducer gas consumption per ton of material reduced. Thus it will be seen that our invention provides significant increases in productivity as compared to conventional shaft furnace processes.

We claim:

1. In a method of reducing iron ore pellets in a vertical shaft moving bed furnace having a countercurrent reducing gas flow, the improvement wherein erratic burden movement is inhibited thus permitting higher furnace operating temperatures and productivity, comprising introducing as the principal source of iron ore a burden of fired iron ore pellets having a porosity of at least 21½% and made by firing green iron ore pellets formed from an iron ore concentrate having a silica content no greater than 2½% with 1.0% to 8.5% finely ground limestone or dolomite and bentonite as a binder, said green pellets having from 7 to 12% moisture.

2. The improvement of claim 1 in which the iron ore concentrate is at least 80% minus 325 mesh.

3. The improvement of claim 1 in which the moisture content of the green pellet is about 8.5 to 9.5%.

4. The improvement of claim 1 in which the fluxed pellets are fired at a temperature of 2100°F to 2400°F.

5. The improvement of claim 1 in which the porosity of the fired pellets is at least 26%.

6. In a method of reducing iron ore pellets in a vertical shaft moving bed furnace having a countercurrent reducing gas flow, the improvement wherein erratic burden movement is inhibited thus permitting higher furnace operating temperatures and productivity, comprising introducing as the principal source of iron ore a burden of fired iron ore pellets formed from green pellets of an iron ore concentrate with lime hydrate as a binder and sufficient limestone or dolomite to provide a basicity of the pellet of from 0.25 to 2.5, said green pellets having a moisture content of at least 7%, and said fired pellets having a porosity of at least 21½% and a silica content no greater than 2½%.

7. The improvement of claim 6 in which the iron ore concentrate is at least 80% minus 325 mesh.

8. The improvement of claim 6 in which the moisture content of the green pellet is about 8.5 to 9.5%.

9. The improvement of claim 6 in which the green pellets are fired at a temperature of 2100°F to 2400°F.

10. Method of reducing iron ore comprising
    a. forming iron ore pellets having at least 8.5% moisture from an iron ore concentrate ground to at least 80% minus 325 mesh and having a silica content no greater than 2½% with about 1 to 8½% limestone or dolomite flux and 0.5 to 0.75% bentonite binder,
    b. firing the pellets to form fired pellets having a porosity of at least 26%, and
    c. charging the fired pellets into a shaft furnace reducer and moving them vertically downwardly therethrough in countercurrent flow to a stream of reducing gas at a hot zone temperature in the range of about 1375° to about 1700°F, and removing the reduced pellets from the reducer.

11. Method of claim 10 in which the pellets are fired at a temperature of 2100°F to 2400°F.

* * * * *

UNITED STATES PATENT OFFICE
CERTIFICATE OF CORRECTION

Patent No. 3,957,486    Dated May 18, 1976

Inventor(s)    Jesus A. Sandoval et al.

It is certified that error appears in the above-identified patent and that said Letters Patent are hereby corrected as shown below:

Column 2, line 53, "time" should read -- times --.

Column 3, line 37, "consist" should read -- consisting --.

Column 4, line 6, after "2%" delete the "comma (,)"

line 51, after "Examples" change "I" to -- II --.

same line, change "II" to -- III --.

In Table I, under "Type of Concentrate", line 3, "Lj" should read -- LJ --.

Columns 5 and 6, before "Table IV" insert the following sentence -- The effects of lime hydrate and dolomite are shown in Tables IV and V respectively. --.

Column 5, line 63, "pellets" should read -- pellet --.

Column 7, line 16, after "be" insert -- a --.

Column 7, line 20, "or" should read -- of --.

Signed and Sealed this

Fifth Day of October 1976

[SEAL]

Attest:

RUTH C. MASON
*Attesting Officer*

C. MARSHALL DANN
*Commissioner of Patents and Trademarks*